United States Patent [19]

Svendsen

[11] Patent Number: 4,606,690

[45] Date of Patent: Aug. 19, 1986

[54] METHOD AND APPARATUS FOR LOAD TRANSFER

[75] Inventor: Lloyd R. Svendsen, East Hanover, N.J.

[73] Assignee: Nabisco Brands, Inc., Parsippany, N.J.

[21] Appl. No.: 608,055

[22] Filed: May 8, 1984

[51] Int. Cl.$^4$ .............................................. B65G 67/00
[52] U.S. Cl. .................................. 414/343; 414/347; 414/400; 414/661; 414/786
[58] Field of Search ............... 414/340, 343, 345, 347, 414/352, 353, 497, 609, 661, 786, 389, 277, 279, 280, 495, 400; 104/113, 164, 162

[56] References Cited

U.S. PATENT DOCUMENTS

| | | | |
|---|---|---|---|
| 103,414 | 5/1870 | Bennett et al. | 104/164 X |
| 1,560,108 | 11/1925 | Simpson | 414/340 X |
| 1,994,399 | 3/1935 | Moreau | 414/343 |
| 3,011,319 | 12/1961 | Ganzenmüller | 414/343 X |
| 3,021,795 | 2/1962 | Hayba et al. | 414/345 X |
| 3,209,926 | 10/1965 | McWilliams | 414/497 X |
| 3,809,268 | 5/1974 | Lutz | 414/343 |
| 4,467,725 | 8/1984 | Haldimann | 104/162 |

Primary Examiner—Leslie J. Paperner
Assistant Examiner—David A. Bucci

[57] ABSTRACT

A method and apparatus for use with a load-elevating carrying device having a load-discharging push mechanism for accurate direct transference of a load from the load-elevating carrying device without the necessity of repeated positioning and adjustment maneuvers of the load device during off-loading procedure. The apparatus of the invention includes a platform member for receiving a load which has a generally vertical wall joined to and extending uprightly from one edge thereof and motion guide elements fixed to the platform member for enabling the motion thereof along a rectilinear path corresponding to the movement of the motion guide elements in response to a force applied in the horizontal direction. There is also includes a transfer track on which the motion guide elements with the platform are mounted for limited travel preferably in an inclined direction so that a load can be pushed from the elevating member of the load-carrying device onto the platform member as it rises up the incline to meet the load and accurately position it thereon without repeated adjusting maneuvers, and be returned by the force of gravity.

8 Claims, 9 Drawing Figures

METHOD AND APPARATUS FOR LOAD TRANSFER

BACKGROUND OF THE INVENTION

The present invention relates to the art of load handling using a load-elevating carrying device, and, in particular, to a means for quickly and accurately off-loading and transferring large loads using a load-elevating apparatus, such as a fork lift, having a load-discharging pushing mechanism.

The art of bulk load handling has been greatly enhanced by the use of material handling machinery, and, more particularly, by the use of load-elevating carrying devices such as lift trucks. In most warehouses, loads are carried on wooden pallets designed to be handled by lift trucks having two tines, or as they are frequently termed, two "forks." Shipment of various commodities can be accomplished more efficiently and economically, however, if the loads are not shipped on pallets but instead are carried on sheets, usually made of cardboard, plastic, etc., sometimes referred to as "slip sheets." While use of slip sheets eliminates the bulk and weight of pallets during transportation, handling loads which are stacked on slip sheets present some unique problems for the lift truck operator.

When a conventional palletized load is to be unloaded, merely lowering the forks to the proper elevation completely frees the forks from the pallet so that the forks need not touch the pallet or the load as the forks are retracted from the pallet. When a slip sheet mounted load is to be unloaded, however, the weight of the load and the increased load-supporting fork surface area provide a very substantial friction which interferes with the retraction of the forks from beneath the load. Such loads have tended to stick to the forks as the forks have been retracted, preventing proper load placement, and sometimes damaging a load.

Attempts to overcome these problems have led to development of off-loading assist mechanisms such as a comb-like attachment through which the load forks may be retracted, with the "teeth" of the comb functioning to strip or comb the load from the forks to leave the load on a pallet. See U.S. Pat. No. 3,381,834. More recently, lift trucks have been provided with a "push-pull" mechanism which clamps onto a load bearing sheet and pulls the load onto the load carrying members or platens at the front of the truck. See U.S. Pat. No. 3,604,414 and U.S. Pat. No. 4,217,074.

Even with these load-handling assist developments, off-loading a load-bearing slip sheet is a time-consuming task, especially when the load is a stack of packages which contain a breakable product. This problem is not alleviated by use of palletized loads in storage facilities, since transported loads must still be transferred to the pallets.

Specifically, when a slip-sheet load is off-loaded, initial care must be taken to properly align the load over the receiving pallet or surface. This task is exacerbated by the fact that the tips of the platens, which must be held at an appropriate angle of from about 3° to 4° by tilting the mast of the lift, are generally positioned slightly above the receiving surface while the push-pull mechanism pushes the load from the platens. This process can easily lead to misalignment such as side slippage or over-drop.

Furthermore, as the load is discharged from the platens, the lift vehicle must be made to move simultaneously in the opposite direction in order to maintain alignment of the edges of the discharging load and the receiving surface. Further maneuvers, such as stopping the vehicle and lowering the platens, are also required during discharge to compensate for upward deflection of the platens resulting from the reduction in weight. Time and care are required to perform this tedious off-loading or load transfer process which causes it to be quite inefficient. Moreover, the lift operator's patience and diligence are quickly eroded normally resulting in damage to the product.

It is, therefore, an object of the present invention to provide, among other things, a means for discharging loads from a load-elevating carrying vehicle having a load-discharging push mechanism whereby the problems usually associated with off-loading are overcome.

SUMMARY OF THE INVENTION

The present invention is a method and apparatus for use with a load-elevating carrying device having a load-discharging push mechanism for accurate direct off-loading of a load therefrom in the absence of positioning-adjustment maneuvers of the load carrying device. The apparatus of the present invention includes a platform member having a generally vertical backstop for receiving the load in combination with a means for moving the platform member in a rectilinear path which is fixed to the platform member so that the path of movement of the platform member corresponds directly to the path of movement of the moving means. The means for moving is responsive to forces applied generally in the horizontal direction.

The means for moving the platform member is mounted on and confined to a transfer track which prevents the moving means from travel beyond a limited linear distance. The transfer track has a first end with a stop to prevent travel of the moving means therefrom and a second end which also has a stop to prevent travel of the moving means from the track. The preferred embodiment also includes a return means which effects the return of the moving means and the platform member to one end after being forced therefrom during operation. In one configuration, the return means can merely include a slight incline of the transfer track from the first end to the second end.

As a result of this configuration, the means for moving rests at the first end, the platform member resting at a corresponding first position for receiving the load, during non-transferring time, and the means for moving is driven up the inclined transfer track in response to the horizontal component of force imparted to the platform member by a load during off-loading. Since the platform member is fixed to the means for moving, it is correspondingly moved upwardly in an inclined linear path to receive the load.

In another embodiment of the invention, the rectilinear transfer track can be essentially horizontal while the return means can be any conventional means by which a vehicular platform is driven to a return position such as a compression or tension spring or a weighted pulley arrangement.

In a preferred embodiment, wheels are fixed to the platform member which are, in turn, also mounted on a slightly inclined track having stops at either end so that the load is prevented from travel beyond the track during off-loading. The incline should be sufficient to return the load-carrying apparatus to the first end, but should not cause the load-receiving platform to rise at an unusually steep grade which would jostle or upset the load. Generally, the angle of the incline can be from about 1° to about 35°, and is preferably from about 2° to about 18°, while the most preferable angles are presently believed to be from about 3.5° to about 8°.

In order to facilitate transferring a load-bearing slip sheet to a pallet, the platform member can conveniently be of dimensions of about 42" in width to about 48" in length so that a pallet can be placed thereon prior to off-loading the slip sheet load. Also, in the preferred embodiment, the wheels can be fixed to the load receiving track to prevent lateral movement by any conventional means, e.g., using wheels having a generally concave circumferential surface and track having a convex cross-section over which the concave-shaped circumferential surfaces of the wheels are mounted. In a preferred embodiment, the circumferential surface of the wheels and the track are a "V" shape.

In operation, the wheeled platform receives the load as it is pushed from the platens of the lift truck up the inclined receiving track so that the surface of the platform rises to continuously meet the load-bearing slip sheet. The receiving track is of sufficient length, e.g., about 8', to accommodate the full length of travel of the receiving platform necessary for the load to be transferred thereto, usually about 4'.

As a result of the invention, the operator of the lift truck can quickly off load the load-bearing slip sheet with assurance that the contents of the load will be safely transferred without the inordinate amount of care normally required in such off-loading procedure.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

Preferred embodiments of the invention have been chosen fo purposes of illustration and description and are shown in the accompanying drawings, wherein.

DETAILED DESCRIPTION OF THE INVENTION

Figure 1:
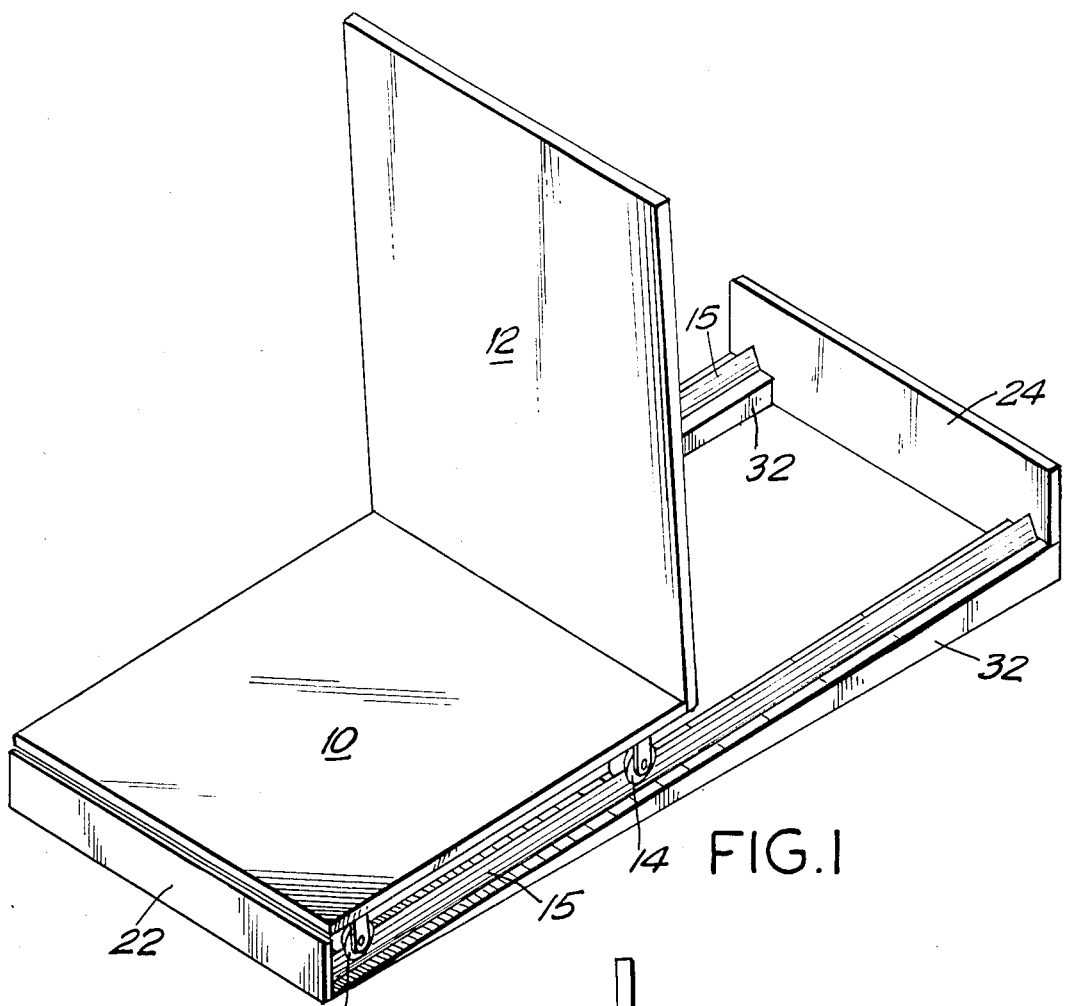
FIG. 1 is a perspective view of a preferred embodiment of the present invention in the rest or non-use position.
Figure 2:
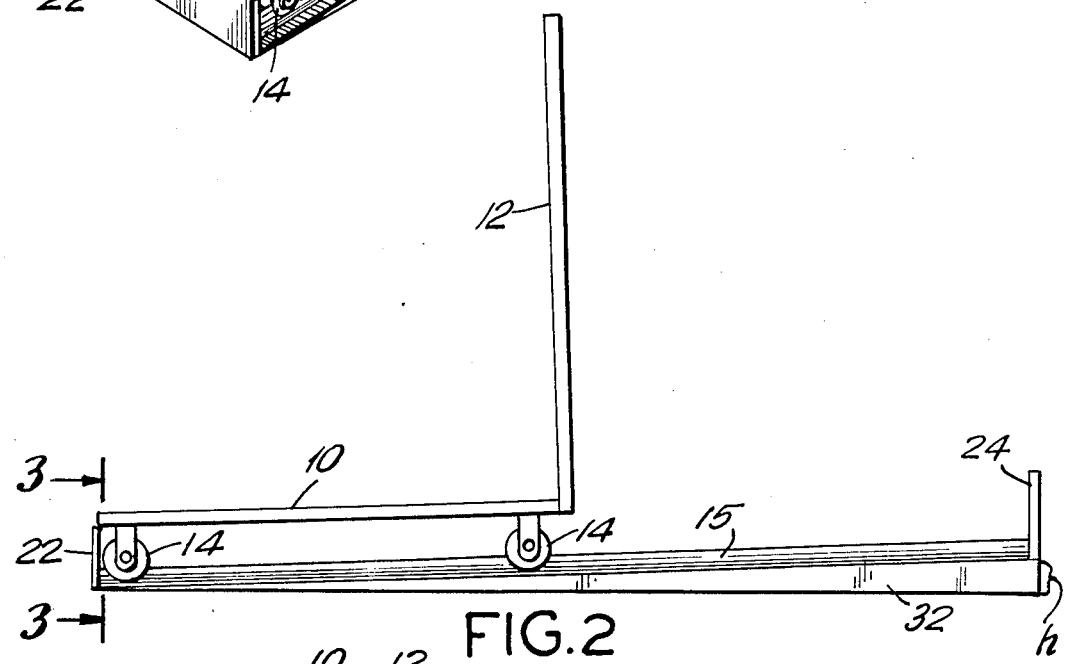
FIG. 2 is a side elevation view of the apparatus of the present invention as shown in FIG. 1.
Figure 3:
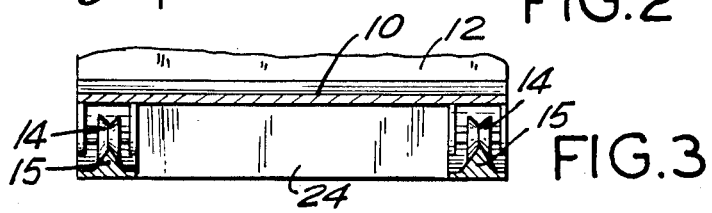
FIG. 3 is a view of the apparatus taken along the line 3—3 of FIG. 2.

Referring to the figures, there is seen in FIGS. 1 and 2 a preferred embodiment of the apparatus of the present invention as it is in the rest or non-transferring position wherein the receiving platform 10, which has affixed thereto load transfer backstop 12, is located at the lower end of transfer track 15. The means for moving the receiving platform in this embodiment includes wheels 14 which are formed with a concave-shaped circumferential surface, preferably a double-interiorly-beveled plane surface which form a "V" shaped cross-section (shown in FIG. 3), so that the platform bearing wheels are held against lateral movement on track 15 which, in turn, has a cross section conforming to the "V" cross-section of the wheels 14. As a result of the cooperating cross sections of the wheels 14 and the rail 15, along with the stopping means at either end of the track, shown in the figures as lower end track stop member 22 and upper end track stop member 24, the load-receiving platform is confined to the rectilinear path established by the load-receiving track 15.

The track 15 can be suitably mounted on a track support 32 which extends the length of the track and is shaped as an elongated wedge having a height h at one end as shown in FIG. 2. By this configuration the load-receiving platform is forced by gravity to the lower end of the inclined track while the apparatus is not in operation. When the transfer device is used to off-load and/or transfer a load from a load-elevating apparatus, the platform 10 is forced to the right as shown in FIG. 2 in response to the horizontal component of force imparted thereto by the discharging load so that the surface of platform 10 rises at an incline to receive the entire load.

Figure 4A:
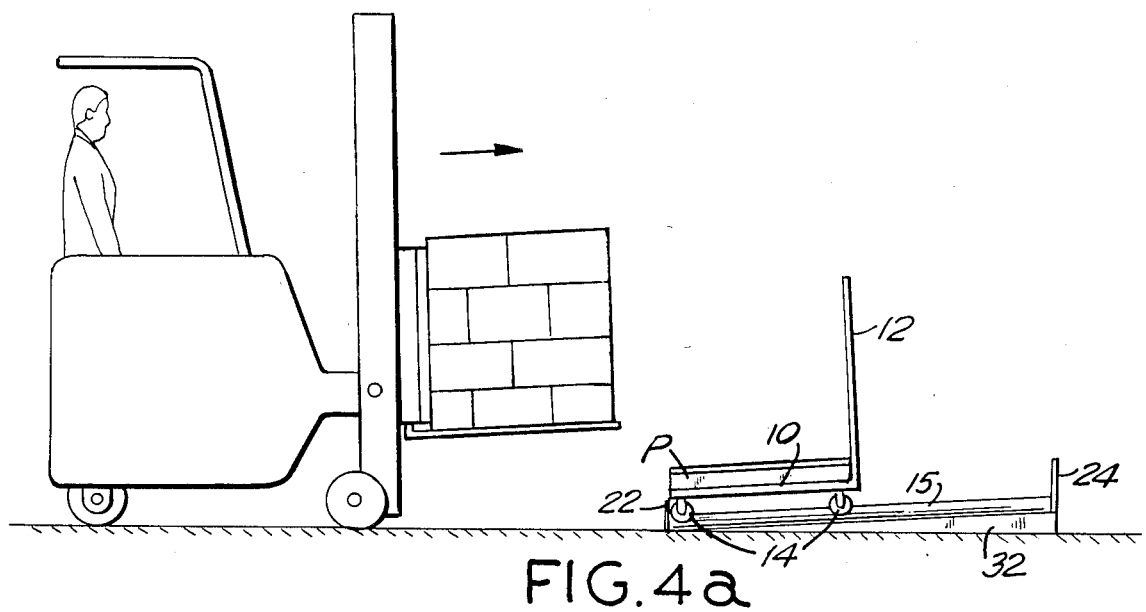
FIGS. 4a-4f depict a method according to the present invention whereby a load-bearing slip sheet is transferred to a pallet.

In order to illustrate the operation of the apparatus according to this embodiment of the present invention, reference is made to FIGS. 4a-4f. FIG. 4a depicts the apparatus of the present invention in the resting position as shown in FIGS. 1 and 2 and a lift truck approaching from the left-hand side with a compositely stacked or "unitized" load on the elevating member. In this example, the load-receiving apparatus has a pallet P positioned on the platform member 10.

Figure 4B:
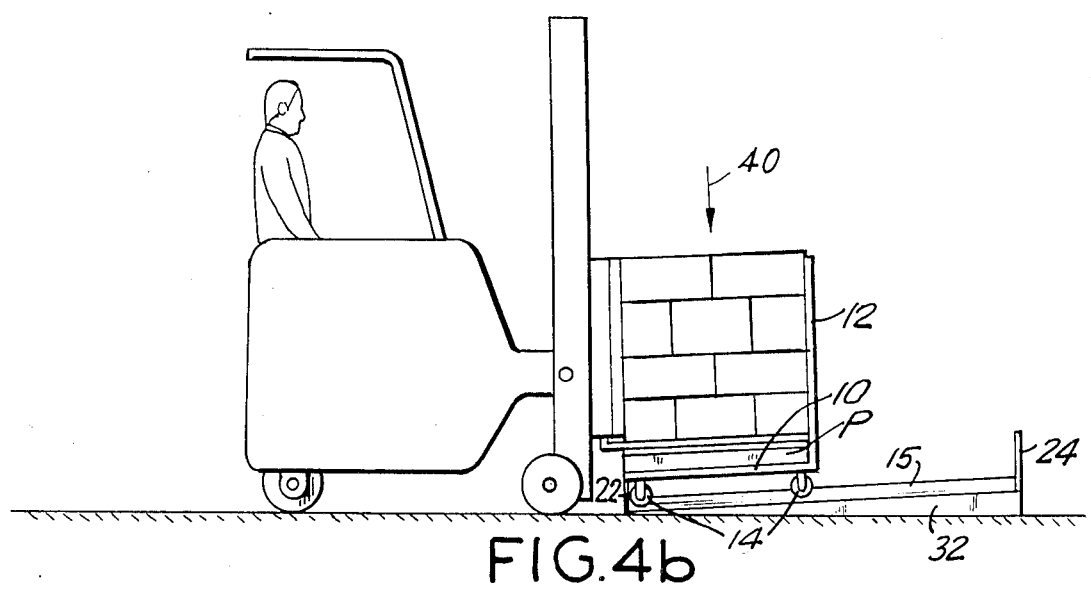

When the load is positioned over the pallet-bearing load-receiving apparatus, the carriage on the elevating mast is lowered as indicated by arrow 40 in FIG. 4b to a position in which the tips of the platens are on or just slightly above the load-receiving surface, whether it be a pallet on the platform 10 or the platform surface itself. The front of the load should be essentially adjacent the load-receiving backstop 12 as shown in FIG. 4b.

Figure 4C:
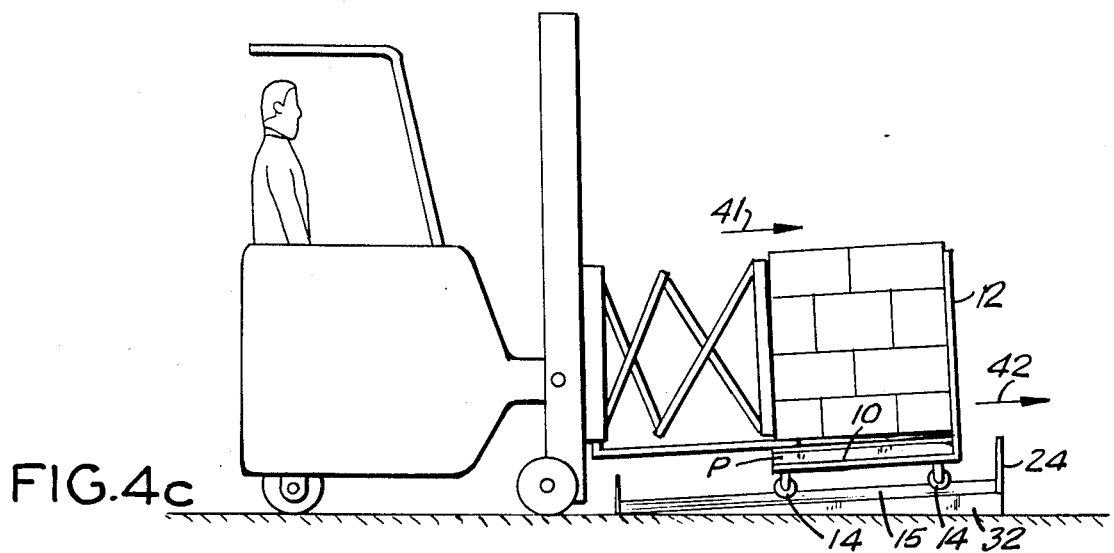

While the lift truck is in this position, the pushing member is extended in the direction of arrow 41 in FIG. 4c to discharge the load onto the load-receiving platform. As a result of the horizontal component of force imparted by the discharging load, the apparatus of the present invention is forced backwards in the direction of arrow 42 in FIG. 4c up the inclined track to receive the discharging load in one continuous movement. Over-drop of the load is prevented by the backstop 12, while side travel and slippage of the load-receiving platform is prevented by the design of the rectilinear transfer track.

Figure 4D:
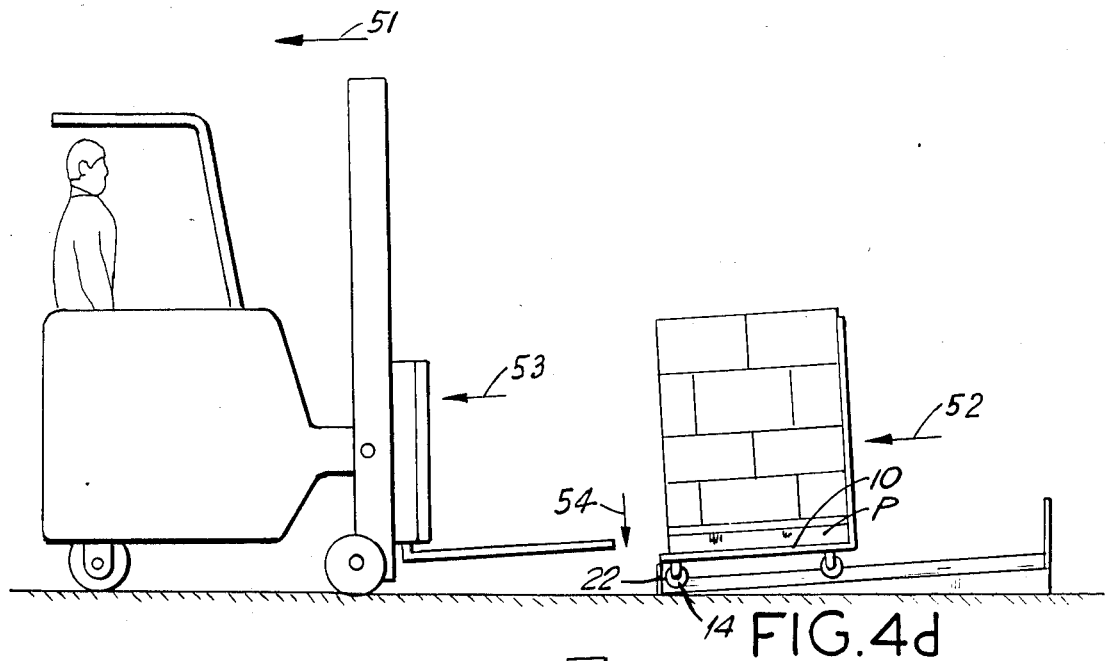

When the load has cleared the platens, the lift truck is backed away from the transferred load as shown by arrow 51 in FIG. 4d. The load-carrying apparatus is forced by gravity down the incline as shown by arrow 52 in FIG. 4d until it comes to the rest position at the bottom of the track. Meanwhile, the pushing member is retracted in the direction of arrow 53 in FIG. 4d to the fully closed position, and the carriage is lowered in the direction of arrow 54 in FIG. 4d so that the platens are generally aligned just below the surface of the pallet P.

Figure 4E:
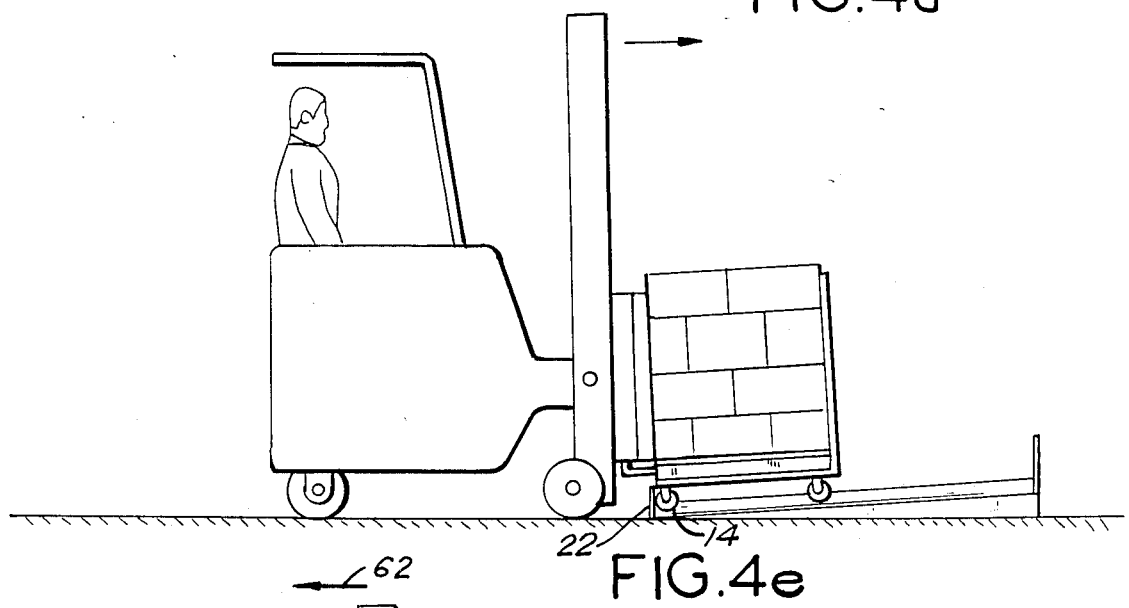

FIG. 4e depicts the lift truck after it has been moved forward in the direction of the arrow to insert the platens into the load-bearing pallet, i.e., between the top surface and the support ramps.

Figure 4F:
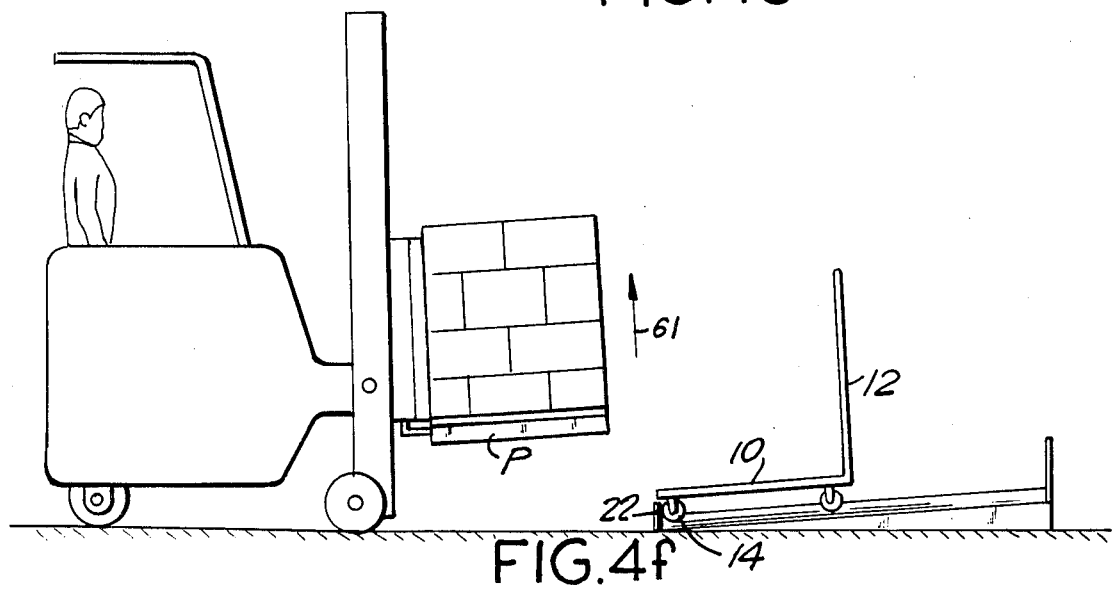

The load-bearing pallet can then be conveniently lifted in the direction as shown by the arrow 61 in FIG. 4f and the lift truck reversed in the direction of arrow 62 in FIG. 4f so that the load can be easily moved to the appropriate storage position.

Since handling of palletized loads is so much more convenient, it is usually desired that such loads be placed on a pallet such as shown in FIGS. 4a–4f as soon as they are unloaded from a truck or railroad car, and thereafter handled on the pallet.

It is noted that there are alternative methods for restricting the linear movement of the load-receiving platform and providing inclined travel to receive the discharging load. For example, the load-receiving platform could just as easily be suspended from an overhead track having sliding members which are restricted in the linear direction to a limited length of travel while at the same time providing an inclined path, springs, or a weighted pulley system. In this way, the floor mounted track as shown in the figures could be eliminated in preference to an overhead track.

Thus, while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. An apparatus for use with a load-elevating carrying device having a load discharging push mechanism for single operation direct transference of a load from the elevating members of said load-elevating carrying device, said apparatus comprising:

means including a platform member for receiving the load from the load-elevating carrying device upon the transference of said load from the elevating members by the load-discharging push mechanism during an off-loading operation, said platform member having a generally vertical wall fixed to and extending upwardly from a part of the edge of said platform member;

means for enabling and guiding motion of said platform member during said off-loading operation along a path corresponding to the path of movement of said enabling and guiding means in response to a force applied to said platform member in the horizontal direction during said off-loading operation, said enabling and guiding means being connected to said platform member;

a transfer track which has a first end and a second end each having a stopping means to prevent linear travel of said enabling and guiding means from said track, and which has means for preventing lateral movement therefrom whereby a confined rectilinear path is defined, said enabling and guiding means being mounted on said confined rectilinear path with said platform member correspondingly confined to movement on said rectilinear path for receiving said load as it is discharged in response to the horizontal component of force imparted to said platform member during said off-loading operation; and further including a return means which comprises an upward incline extending from said first end to said second end, whereby the force of gravity urges said platform member toward said first end so that the load can be removed from said platform at said first end.

2. The apparatus of claim 1, wherein said incline is at an angle of from about 1° to about 35°.

3. The apparatus of claim 2, wherein said angle is from about 2° to about 18°.

4. The apparatus of claim 3, wherein said angle is from about 3.5° to about 8°.

5. The apparatus of claim 1, wherein said enabling and guiding means comprises wheels fixed to said platform member and mounted on said transfer track.

6. The apparatus of claim 5, wherein said means for preventing lateral movement comprises wheels having a generally concave circumferential surface and said transfer track having a generally convex cross section which fits into said concave circumferential surface of said wheels whereby said wheels are mounted on said track to prevent lateral movement of said platform member.

7. A method for transferring a load from a load-elevating carrying device having a load-discharging push mechanism with a single pushing operation comprising:

positioning a load mounted on the elevating portion of said device over a receiving platform having a generally vertical wall extending upwardly from the far end thereof, and mounted on moving means for restricted travel on a transfer track, said transfer track having a first end and a second end each having a means for stopping said platform from linear travel off said track and a means for preventing lateral movement from said track, and said second end elevated from said first end whereby an inclined rectilinear path is formed on which said platform member rises to meet said load in response to a horizontal component of force imparted to said platform member during off-loading, and pushing the load from said elevating member of said device to discharge said load against said vertical wall and onto said platform member until said load clears said elevating member.

8. The method of claim 7, wherein a pallet is placed on said platform member prior to off-loading said load.

* * * * *